US012798998B2

(12) United States Patent
Gong et al.

(10) Patent No.: US 12,798,998 B2
(45) Date of Patent: Nov. 17, 2026

(54) WATER SOFTENING CONTROL METHOD AND APPARATUS, ELECTRONIC DEVICE AND STORAGE MEDIUM

(71) Applicants: FOSHAN SHUNDE MIDEA WATER DISPENSER MANUFACTURING CO., LTD., Foshan (CN); MIDEA GROUP CO., LTD., Foshan (CN)

(72) Inventors: Ziming Gong, Foshan (CN); Zhipeng Hao, Foshan (CN); Jingkai Luo, Foshan (CN); Jiadong Chen, Foshan (CN); Yiguang Qiu, Foshan (CN); Bo Zhang, Foshan (CN); Pu Qing, Foshan (CN); Chenghuan Hu, Foshan (CN); Yumin Liao, Foshan (CN)

(73) Assignees: FOSHAN SHUNDE MIDEA WATER DISPENSER MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 452 days.

(21) Appl. No.: 18/567,775

(22) PCT Filed: Apr. 13, 2023

(86) PCT No.: PCT/CN2023/088189
§ 371 (c)(1),
(2) Date: Dec. 7, 2023

(87) PCT Pub. No.: WO2024/051165
PCT Pub. Date: Mar. 14, 2024

(65) Prior Publication Data

US 2026/0184601 A1 Jul. 2, 2026

(30) Foreign Application Priority Data

Sep. 5, 2022 (CN) ......................... 202211080549.7

(51) Int. Cl.
*C02F 1/00* (2023.01)
*B01J 49/75* (2017.01)
(Continued)

(52) U.S. Cl.
CPC ............... *C02F 1/008* (2013.01); *B01J 49/75* (2017.01); *B01J 49/85* (2017.01); *C02F 1/42* (2013.01);
(Continued)

(58) Field of Classification Search
None
See application file for complete search history.

(56) References Cited

U.S. PATENT DOCUMENTS 4,275,448 A 6/1981 Le Dall
5,544,072 A 8/1996 Zimmerman et al.
(Continued)

FOREIGN PATENT DOCUMENTS

CN 105266740 A 1/2016
CN 206927659 U 1/2018
(Continued)

OTHER PUBLICATIONS

Translation of WO-2023248920 (Year: 2026).*
(Continued)

*Primary Examiner* — Richard C Gurtowski
(74) *Attorney, Agent, or Firm* — K&L Gates LLP

(57) ABSTRACT

The present disclosure relates to the field of water softening device and provides a water softening control method and apparatus, electronic device and storage medium. The water softening control method includes: obtaining a comparison result between water consumption of a user and a soft water volume threshold; regenerating resin for water softening through a water softening agent in accordance with a determination that the water consumption of the user is greater
(Continued)

than or equal to the soft water volume threshold; obtaining first consumption of the water softening agent during the resin regeneration; and determining second water consumption for the resin regeneration based on the first consumption and the first water consumption for the resin regeneration.

18 Claims, 5 Drawing Sheets

(51) Int. Cl.
*B01J 49/85* (2017.01)
*C02F 1/42* (2023.01)

(52) U.S. Cl.
CPC .... *C02F 2209/006* (2013.01); *C02F 2209/40* (2013.01); *C02F 2303/16* (2013.01)

(56) References Cited

U.S. PATENT DOCUMENTS

| | | | | |
|---|---|---|---|---|
| 2006/0114593 | A1* | 6/2006 | Sagaert | G01F 23/296 360/72.2 |
| 2007/0199900 | A1 | 8/2007 | Zimmerman | |
| 2017/0108367 | A1* | 4/2017 | Riley | A47J 31/057 |
| 2017/0362093 | A1 | 12/2017 | Klingensmith et al. | |
| 2025/0326664 | A1* | 10/2025 | Chernov | B01J 49/85 |

FOREIGN PATENT DOCUMENTS

| | | | | |
|---|---|---|---|---|
| CN | 108585117 | A | 9/2018 | |
| CN | 109319885 | A | 2/2019 | |
| CN | 109704440 | A | 5/2019 | |
| CN | 110465333 | A | 11/2019 | |
| CN | 114956261 | A | 8/2022 | |
| CN | 114985019 | A | 9/2022 | |
| CN | 114988523 | A | 9/2022 | |
| CN | 115490299 | A | 12/2022 | |
| JP | 2000308885 | A | 11/2000 | |
| JP | 2011050961 | A | 3/2011 | |
| JP | 2021041377 | A | 3/2021 | |
| WO | WO-2023248920 | A1 * | 12/2023 | B01J 47/026 |

OTHER PUBLICATIONS

International search report received in the priority international application PCT/CN2023/088189, mailed Aug. 4, 2023.
Search Report received in CN Application No. 202211080549.7; mailed Aug. 19, 2024.
EESR Received in EP Application No. 23804890.4, mailed Sep. 9, 2024.

* cited by examiner

WATER SOFTENING CONTROL METHOD AND APPARATUS, ELECTRONIC DEVICE AND STORAGE MEDIUM

CROSS-REFERENCE TO RELATED APPLICATION

The present disclosure is a national phase of international application PCT/CN2023/088189, filed on Apr. 13, 2023, which claims priority to Chinese Patent Application No. 202211080549.7, filed on Sep. 5, 2022, which are hereby incorporated by reference in its entirety.

FIELD

The present disclosure relates to the field of water softening device, and in particular, to a water softening control method and apparatus, an electronic device and a storage medium.

BACKGROUND

A water softener is a device that reduces hardness of water. A main working principle of the water softener is to exchange functional ions in resin with calcium ions and magnesium ions in the water, and absorb excess calcium ions and magnesium ions in the water using an ion exchange technology to remove scale to obtain soft water.

After ions are exchanged to make an amount of soft water, the resin absorbing hardness ions will reach saturated. The resin needs to be regenerated, which uses a regeneration material (such as a water softening agent) to replace hardness ions in the resin, and then the resin can continue to be used.

However, if a user performs resin regeneration inappropriately or frequently, it will lead to excessive resin regeneration. Excessive resin regeneration will cause a regeneration material to be consumed too quickly, which will lead to a waste of the regeneration material, and low water softening control efficiency of a current water softener.

SUMMARY

The present disclosure aims to solve at least one of the problems in the related art. Therefore, the present disclosure provides a water softening control method that can improve a water softening control efficiency of a water softener by automatically regenerating resin and accurately controlling a usage amount of a regeneration material.

The present disclosure further provides a water softening control device, a water softener, an electronic device, a storage medium and a computer program product.

A water softening control method according to an embodiment of the present disclosure includes:

obtaining a comparison result between water consumption of a user and a soft water volume threshold;

regenerating resin for water softening through a water softening agent in accordance with a determination that the water consumption of the user is greater than or equal to the soft water volume threshold, where a usage amount of the water softening agent is determined based on first water consumption for a resin regeneration, and the first water consumption for the resin regeneration is water consumption for resin regeneration during a previous resin regeneration process;

obtaining first consumption of the water softening agent during the resin regeneration; and determining second water consumption for the resin regeneration based on the first consumption and the first water consumption for the resin regeneration, where the second water consumption for the resin regeneration is water consumption for resin regeneration during a next resin regeneration process.

According to the water softening control method of the embodiment of the present disclosure, by regenerating the resin through the water softening agent in accordance with the determination that the water consumption of the user is greater than or equal to the soft water volume threshold, and accurately determining the water consumption for the resin regeneration during the next resin regeneration process based on water softening agent consumption for resin regeneration and ideal water consumption for the resin regeneration, excessive resin regeneration is avoided, and the water consumption for the resin regeneration can be accurately controlled. Since the usage amount of the water softening agent is determined based on the water consumption for the resin regeneration, the usage amount of the water softening agent can be accurately controlled, which improves a water softening control efficiency of the water softener.

According to an embodiment of the present disclosure, the determining the second water consumption for the resin regeneration based on the first consumption and the first water consumption for the resin regeneration includes:

determining the second water consumption for the resin regeneration by subtracting a first adjustment value from a first water consumption for the resin regeneration in accordance with a determination that the first consumption is greater than a consumption threshold of the water softening agent; or determining the second water consumption for the resin regeneration by adding a first adjustment value to a first water consumption for the resin regeneration in accordance with a determination that the first consumption is less than a consumption threshold of the water softening agent;

where the first adjustment value is an absolute value of a difference between the first consumption and the consumption threshold.

By comparing the consumption of the water softening agent with the consumption threshold, and taking an adjusted first water consumption for the resin regeneration as the water consumption for the resin regeneration during the next resin regeneration process, the usage amount of the water softening agent can be accurately controlled through accurately controlling the water consumption for the resin regeneration, and the water softening control efficiency of the water softener can be improved.

According to an embodiment of the present disclosure, the water consumption of the user is obtained based on the following steps:

obtaining a pulse signal generated when water flows through a flowmeter;

determining a waterflow velocity based on the pulse signal; and determining the water consumption of the user based on the waterflow velocity and water usage duration.

According to an embodiment of the present disclosure, the determining the waterflow velocity based on the pulse signal includes:

determining a number of falling edges of the pulse signal; and determining the waterflow velocity based on the number of falling edges and a pulse conversion ratio of the flowmeter.

By accurately obtaining the water consumption of the user, excessive resin regeneration can be avoided, and the water softening control efficiency of the water softener is improved.

According to an embodiment of the present disclosure, the obtaining the first consumption of the water softening agent during the resin regeneration includes:

obtaining a first remaining amount of the water softening agent and a second remaining amount of the water softening agent, where the first remaining amount is a remaining amount of the water softening agent before the resin regeneration, and the second remaining amount is a remaining amount of the water softening agent after the resin regeneration; and determining the first consumption of the water softening agent during the resin regeneration based on the first remaining amount and the second remaining amount.

According to an embodiment of the present disclosure, the obtaining the first remaining amount of the water softening agent includes:

determining information of distance between a top of the water softening agent and a photoelectric sensor, where the photoelectric sensor is located on a top of a water softening agent storage unit; and determining the first remaining amount of the water softening agent based on the information of distance, a total height of the water softening agent storage unit and a capacity of the water softening agent storage unit.

By accurately obtaining the remaining amount of the water softening agent before resin regeneration and the remaining amount of the water softening agent after resin regeneration, the consumption of the water softening agent can be accurately determined to further determine the water consumption for the resin regeneration during the next resin regeneration process based on the usage amount of the water softening agent, and the water consumption for the resin regeneration can be accurately controlled. Since the usage amount of the water softening agent is determined based on the water consumption for the resin regeneration, the usage amount of the water softening agent can be accurately controlled, which improves a water softening control efficiency of the water softener.

According to an embodiment of the present disclosure, after the obtaining the comparison result between the water consumption of the user and the soft water volume threshold, the method further includes:

regenerating the resin for water softening through a water softening agent in accordance with a determination that the water consumption of the user is less than the soft water volume threshold and a resin regeneration command is received, where the usage amount of the water softening agent is determined based on a used flow percentage and the first water consumption for the resin regeneration, and the used flow percentage is determined based on the water consumption of the user and the soft water volume threshold;

obtaining second consumption of the water softening agent during the resin regeneration; and determining the second water consumption for the resin regeneration based on the second consumption, the first water consumption for the resin regeneration and the used flow rate percentage.

According to an embodiment of the present disclosure, the determining the second water consumption for the resin regeneration based on the second consumption, the first water consumption for the resin regeneration and the used flow rate percentage includes:

determining the second water consumption for the resin regeneration by subtracting a second adjustment value from the first water consumption for the resin regeneration in accordance with a determination that the second consumption is greater than a first product; or determining the second water consumption for the resin regeneration by adding a second adjustment value to the first water consumption for the resin regeneration in accordance with a determination that the second consumption is less than the first product;

where the second adjustment value is an absolute value of a difference between the second consumption and the first product, and the first product is a product of the used flow percentage and the consumption threshold of the water softening agent.

When the user intervenes in resin regeneration, the used flow rate percentage is determined based on the water consumption of the user and the soft water volume threshold, the water consumption for the resin regeneration is adjusted based on the used flow rate percentage to accurately determine the water consumption for the resin regeneration of this resin regeneration, and the water consumption for the resin regeneration during the next resin regeneration process is determined based on the water softening agent consumption and the used flow rate of this resin regeneration, which can avoid excessive resin regeneration and accurately control the water consumption for the resin regeneration. Since the usage amount of the water softening agent is determined based on the water consumption for the resin regeneration, the usage amount of the water softening agent can be accurately controlled, which improves a water softening control efficiency of the water softener.

A water softening control device according to an embodiment of the present disclosure includes:

a first obtaining device, configured to obtain a comparison result between water consumption of a user and a soft water volume threshold;

a regenerating device, configured to regenerate resin for water softening through a water softening agent in accordance with a determination that the water consumption of the user is greater than or equal to the soft water volume threshold, where a usage amount of the water softening agent is determined based on first water consumption for the resin regeneration, and the first water consumption for the resin regeneration is water consumption for resin regeneration during a previous resin regeneration process;

a second obtaining device, configured to obtain first consumption of the water softening agent during the resin regeneration; and a determining device, configured to determine second water consumption for the resin regeneration based on the first consumption and the first water consumption for the resin regeneration, where the second water consumption for the resin regeneration is water consumption for resin regeneration during a next resin regeneration process.

A water softener according to an embodiment of the present disclosure includes a water softener body, a flowmeter, an electronic control system, a photoelectric sensor, a water softening agent storage unit and a processor provided in the water softener body, where when being executed, the processor performs any one of the water softening control methods above.

An electronic device according to an embodiment of the present disclosure includes a memory, a processor and a computer program stored in the memory and executable on the processor, where when the processor executes the computer program, the processor performs any one of the water softening control methods above.

A non-transitory computer-readable storage medium according to an embodiment of the present disclosure having a computer program stored thereon, where when executed by a processor, the computer program performs any one of the water softening control methods above.

A computer program product according to an embodiment of the present disclosure includes a computer program, where when executed by a processor, the computer program performs any one of the water softening control methods above.

One or more of the above solutions in the embodiments of the present disclosure have at least one of the following effects.

By regenerating the resin through the water softening agent in accordance with the determination that the water consumption of the user is greater than or equal to the soft water volume threshold, and accurately determining the water consumption for the resin regeneration during the next resin regeneration process based on water softening agent consumption for resin regeneration and ideal water consumption for the resin regeneration, excessive resin regeneration is avoided, and the water consumption for the resin regeneration can be accurately controlled. Since the usage amount of the water softening agent is determined based on the water consumption for the resin regeneration, the usage amount of the water softening agent can be accurately controlled, and water softening control efficiency of the water softener is improved.

When the user intervenes in resin regeneration, the used flow rate percentage is determined based on the water consumption of the user and the soft water volume threshold, the water consumption for the resin regeneration is adjusted based on the used flow rate percentage to accurately determine the water consumption for the resin regeneration of this resin regeneration, and the water consumption for the resin regeneration during the next resin regeneration process is determined based on the water softening agent consumption and the used flow rate of this resin regeneration, which can avoid excessive resin regeneration and accurately control the water consumption for the resin regeneration. Since the usage amount of the water softening agent is determined based on the water consumption for the resin regeneration, the usage amount of the water softening agent can be accurately controlled, and the water softening control efficiency of the water softener is improved.

By accurately obtaining the remaining amount of the water softening agent before resin regeneration and the remaining amount of the water softening agent after resin regeneration, the consumption of the water softening agent can be accurately determined to further determine the water consumption for the resin regeneration during the next resin regeneration process based on the consumption of the water softening agent, and the water consumption for the resin regeneration can be accurately controlled. Since the usage amount of the water softening agent is determined based on the water consumption for the resin regeneration, the usage amount of the water softening agent can be accurately controlled, and the water softening control efficiency of the water softener is improved.

By accurately obtaining the water consumption of the user, excessive resin regeneration can be avoided, and the water softening control efficiency of the water softener is improved.

Embodiments of the present disclosure will be set forth in part in the description which follows and, in part, will be apparent from the description, or may be learned by practice of the presented disclosure.

BRIEF DESCRIPTION OF DRAWINGS

In order to clearly illustrate the solutions according to the present application or the related art, the accompanying drawings used in the description of the embodiments of the present application or the related art are briefly introduced below. It should be noted that the drawings in the following description are of only part embodiments of the present application.

DETAILED DESCRIPTION OF THE EMBODIMENTS

Embodiments of the present disclosure are further described in detail below with reference to the drawings and embodiments. The following embodiments are intended to illustrate the disclosure, but are not intended to limit the scope of the disclosure.

In the description of the embodiments of the present disclosure, it should be noted that the terms "first", "second" and "third" are only for descriptive purposes and cannot be understood as indicating or implying relative importance.

In the description of this specification, descriptions with reference to the terms "one embodiment", "some embodiments", "examples", "specific examples", or "some examples" etc. mean that specific features, structure, materials or characteristics described in conjunction with the embodiment or example are included in at least one embodiment or example of the embodiments of the present disclosure. In this specification, the schematic expressions of the above terms do not necessarily refer to the same embodiment or example. Furthermore, the particular features, structures, materials or characteristics described can be combined in any suitable manner in any one or more embodiments or examples.

Figure 1:
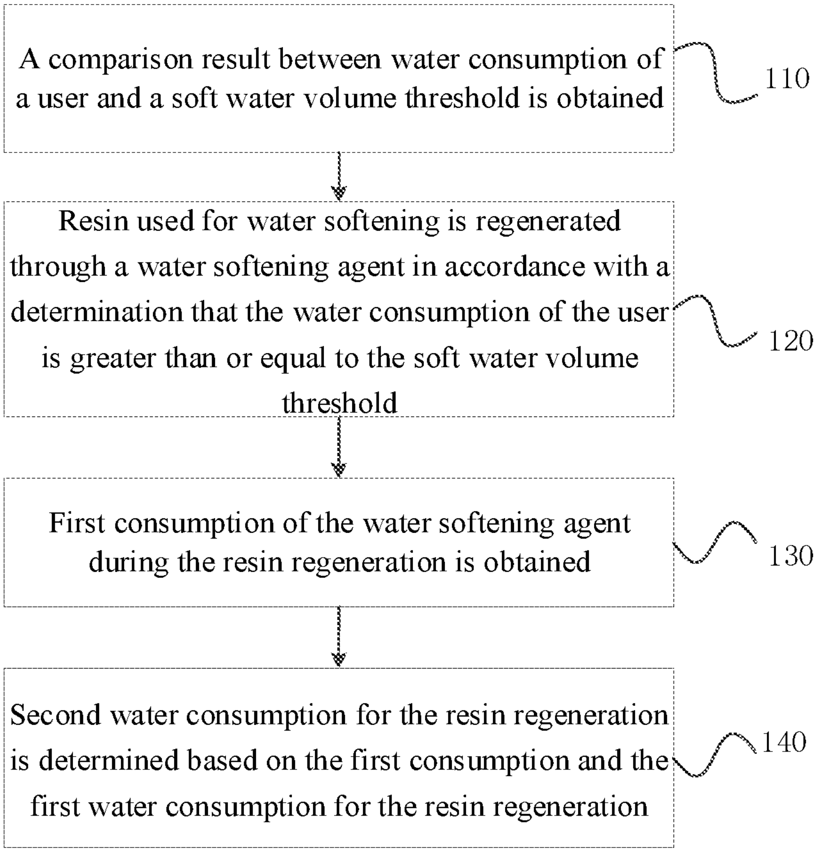
FIG. 1 is a first schematic flow chart of a water softening control method according to an embodiment of the present disclosure.

FIG. 1 is a first schematic flow chart of a water softening control method according to an embodiment of the present disclosure. As shown in FIG. 1, the water softening control method includes the following blocks.

Block 110: a comparison result between water consumption of a user and a soft water volume threshold is obtained.

The water softening control method in this embodiment can be applied to a water softener. The water softener includes a water softener body, a flowmeter, an electronic control system, a photoelectric sensor, a water softening agent storage unit and a processor provided in the water softener body. The flowmeter is configured to obtain the water consumption of the user, the electronic control system is configured to cooperate with the flowmeter to obtain the water consumption of the user, the photoelectric sensor is provided on a top of the water softening agent storage unit, and the water softening agent storage unit is configured to store the water softening agent. In this embodiment, the water softening agent storage unit may be called a salt box, and the processor is configured to perform the water softening control method when being executed.

In this embodiment, tap water can enter the water softener from a water inlet, enter an ion exchange area of a resin tank through a water inlet line with a soft water valve. The tap water is softened in the ion exchange area, flows out from the ion exchange area to a water outlet line, and then pass through the flowmeter and flows out to a user water pipeline for the user to use.

The water consumption of the user is volume of water passing through the user water pipeline. When the resin in the resin tank still has a water softening capability, the water used by the user is soft water. When the resin absorbing hardness ions reaches saturated, the water used by the user is unsoftened water. When the resin absorbing hardness ions reaches saturated, the hardness ions in the resin need to be replaced by a regeneration material, the resin can regain the water softening capability.

In this embodiment, the regeneration material may be a water softening agent, and the water softening agent may be soda ash, phosphate, etc.

In this embodiment, the water used by the user may be soft water, unsoftened water, or a mixture of soft water and untreated water.

The soft water volume threshold is determined based on a maximum volume of water that can be softened by an initial resin or the regenerated resin. For example, the soft water volume threshold can be the maximum volume of water that can be softened by the initial resin or the regenerated resin, or the soft water volume threshold can be a proportion of the maximum volume of water that can be softened by the initial resin or the regenerated resin, such as 90%, 95%, 99%, etc. In this embodiment, the soft water volume threshold is not specifically limited.

In this embodiment, the water consumption of the user and the soft water volume threshold can be obtained regularly. The water consumption of the user is compared with the soft water volume threshold.

A comparison result between the water consumption of the user and the soft water volume threshold may include that the water consumption of the user is greater than or equal to the soft water volume threshold, or the water consumption of the user is less than the soft water volume threshold.

Block 120: resin for water softening is regenerated through a water softening agent in accordance with a determination that the water consumption of the user is greater than or equal to the soft water volume threshold. A usage amount of the water softening agent is determined based on first water consumption of a resin regeneration, and the first water consumption for the resin regeneration is water consumption for resin regeneration during a previous resin regeneration process.

In this embodiment, the water softening agent can be dissolved in water, and the resin in the resin tank can be regenerated with dissolving liquid. It should be noted that a dissolved amount of the water softening agent is related to water injection volume, that is, the greater the water injection volume, the more the water softening agent is dissolved, and the smaller the water injection volume, the less the water softening agent is dissolved.

Based on this, in accordance with a determination that the water consumption of the user is greater than or equal to the soft water volume threshold, it means that a current water softening capability of the resin is very weak or the resin has even lost the water softening capability. Therefore, the water softening agent needs to be configured to regenerate the resin in the resin tank without user intervention.

It should be noted that when the water softening agent is configured to regenerate the resin for water softening, the usage amount of the water softening agent is determined based on the first water consumption for the resin regeneration, that is, the water injection volume, and the first water consumption for the resin regeneration is the water consumption for the resin regeneration during the previous resin regeneration process.

It should be noted that when the resin is regenerated for the first time, the water consumption for the resin regeneration can be the water injection volume obtained under default optimal experimental environment based on a large number of experiments. For example, A1 (unit: L) and Bn (unit: KG) can be defined. Under the water injection volume of A1, each time when the amount of water softening agent Bn is dissolved, effect of single resin regeneration is the best.

Block 130: first consumption of the water softening agent during the resin regeneration is obtained.

The first consumption is the water softening agent consumption for the current resin regeneration, and is defined as the first consumption in order to distinguish it from other consumptions.

The water softening agent consumption in each resin regeneration can be calculated based on remaining water softening agent before the resin regeneration and the remaining water softening agent after the resin regeneration.

Block 140: second water consumption for the resin regeneration is determined based on the first consumption and the first water consumption for the resin regeneration. The second water consumption for the resin regeneration is water consumption for resin regeneration during a next resin regeneration process.

In this embodiment, the second water consumption for the resin regeneration is the water consumption for the resin regeneration during the next resin regeneration process. The first water consumption for the resin regeneration is the water consumption for the resin regeneration during the previous resin regeneration process.

When the second water consumption for the resin regeneration is determined based on the first consumption and the first water consumption for the resin regeneration, it is also necessary to obtain a consumption threshold of the water softening agent. The consumption threshold of the water softening agent can be the amount of the water softening agent dissolved to achieve best effect of single resin regeneration with the water injection volume under the default optimal experimental environment.

In this embodiment, whether to add, subtract or not adjust the first water consumption for the resin regeneration, as well as an adjustment amount when adjusting can be determined by comparing the first consumption with the consumption threshold of the water softening agent.

According to the water softening control method of the embodiment of the present disclosure, by regenerating the resin through the water softening agent in accordance with the determination that the water consumption of the user is greater than or equal to the soft water volume threshold, and accurately determining the water consumption for the resin regeneration during the next resin regeneration process based on water softening agent consumption for resin regeneration and ideal water consumption for the resin regeneration, excessive resin regeneration is avoided, and the water consumption for the resin regeneration can be accurately controlled. Since the usage amount of the water softening agent is determined based on the water consumption for the resin regeneration, the usage amount of the water softening agent can be accurately controlled, and water softening control efficiency of the water softener is improved.

The present disclosure can dynamically adjust the water injection volume based on the water consumption of the user and remaining effective softening flux detected by the flowmeter, combined with a percentage of salt amount detected by the photoelectric sensor, to prevent excessive regeneration of the resin and achieve the purpose of reducing salt consumption. The water softening effect of the resin after each regeneration is also guaranteed.

Figure 2:
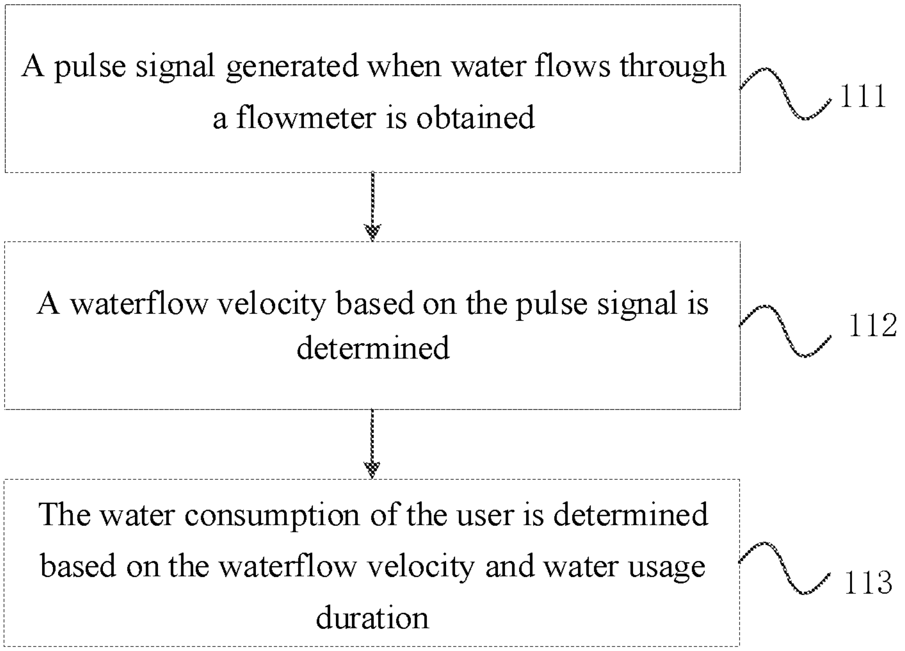
FIG. 2 is a second schematic flow chart of a water softening control method according to an embodiment of the present disclosure.

Based on the above embodiments, FIG. 2 is a second schematic flow chart of a water softening control method according to an embodiment of the present disclosure. As shown in FIG. 2, the above step 110 may include the following blocks.

Block 111: a pulse signal generated when water flows through a flowmeter is obtained.

Block 112: a waterflow velocity is determined based on the pulse signal.

Block 113: the water consumption of the user is determined based on the waterflow velocity and water usage duration.

It can be understood that when the user uses water through the user water pipeline, the water flows and drives the flowmeter to rotate, and the rotation of the flowmeter generates a Hall induction signal pulse. Therefore, in this embodiment, the electronic control system can collect the pulse signal generated by the flowmeter in real-time through external interrupts. The waterflow velocity is further calculated based on the pulse signal. Furthermore, after the waterflow velocity is obtained, the waterflow velocity and the water usage duration can be multiplied to obtain the water consumption of the user within the time corresponding to the water usage duration. The water usage duration can be obtained through a timer, and the water usage duration from when the user starts using the water to when the user stops using the water is obtained.

Further, the above block 112 may include the following steps.

Step 1121: a number of falling edges of the pulse signal is determined.

Step 1122: the waterflow velocity is determined based on the number of falling edges and a pulse conversion ratio of the flowmeter.

When the waterflow velocity based on the pulse signal is determined, a number of falling edges of the pulse signal can be determined through the electronic control system. Periodic interrupts are further combined to count a number of falling edges of pulse signal per second, and the waterflow velocity is calculated through a waterflow velocity calculation formula. The calculation formula of waterflow velocity can be as follows:

$$P \times 60 \div L = J,$$

where J is the waterflow velocity, with a unit of L/min, P is the number of falling edges of the pulse signal, and L is a Hall pulse conversion ratio of the flowmeter, with a unit of N/L.

In this embodiment, by accurately obtaining the water consumption of the user, excessive resin regeneration can be avoided, and the water softening control efficiency of the water softener is improved.

Figure 3:
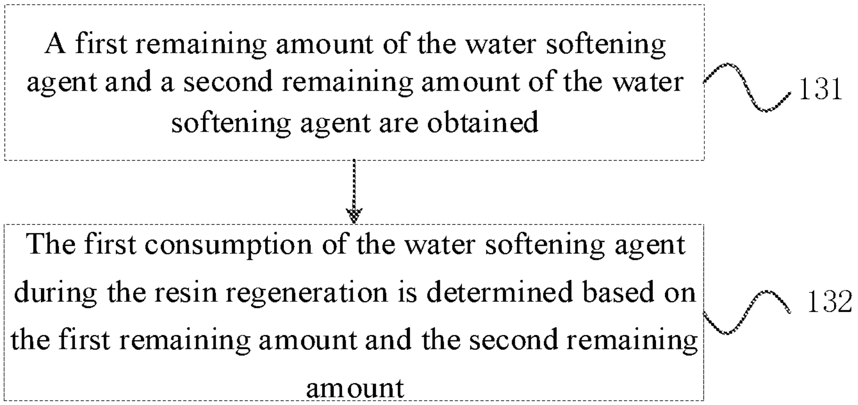
FIG. 3 is a third schematic flow chart of a water softening control method according to an embodiment of the present disclosure.

Based on the above embodiments, FIG. 3 is a third schematic flow chart of a water softening control method according to an embodiment of the present disclosure. As shown in FIG. 3, the above block 130 may include the following blocks.

Block 131: a first remaining amount of the water softening agent and a second remaining amount of the water softening agent are obtained. The first remaining amount is a remaining amount of the water softening agent before the resin regeneration, and the second remaining amount is a remaining amount of the water softening agent after the resin regeneration.

Block 132: the first consumption of the water softening agent during the resin regeneration is determined based on the first remaining amount and the second remaining amount.

In block 130, it is necessary to obtain the remaining amount of the water softening agent before the resin regeneration and take it as the first remaining amount, and obtain the remaining amount of the water softening agent after the resin regeneration and take it as the second remaining amount.

After the first remaining amount and the second remaining amount is obtained, a difference between the first remaining amount and the second remaining amount can be obtained. The difference is the consumption of the water softening agent during the resin regeneration, which is defined as the first consumption.

Furthermore, the above block 131 includes the following steps.

Step 1311: information of distance between atop of the water softening agent and a photoelectric sensor is determined. The photoelectric sensor is located on a top of a water softening agent storage unit.

Step 1312: the first remaining amount of the water softening agent is determined based on the information of distance, a total height of the water softening agent storage unit and a capacity of the water softening agent storage unit.

When the remaining amount of the water softening agent before the resin regeneration is obtained, the information of distance from the top of the water softening agent to the photoelectric sensor (such as, a salt surface in the salt box to a photoelectric sensor on a top of the salt box) can be collected through the photoelectric sensor. It should be noted that since the photoelectric sensor can only collect signals, the signals collected by the photoelectric sensor need to be converted into a PWM signal through an analog-to-digital conversion and input to the electronic control system. The information of distance between the top of the water softening agent and the photoelectric sensor is calculated through a preset distance calculation formula, and the preset distance calculation formula can be as shown in the following formula:

$$W-E\times 50\ \text{us}/100+50=R,$$

where W is a number of interrupts of high-level durations in the PWM signal, E is a dead time duration in the PWM signal, and R is the information of distance between the top of the water softening agent and the photoelectric sensor.

Furthermore, the total height of the water softening agent storage unit and the capacity of the water softening agent storage unit are obtained, for example, a total height of the salt box and a capacity of the salt box are obtained. Based on the information of distance between the top of the water softening agent and the photoelectric sensor, the total height of the water softening agent storage unit and the capacity of the water softening agent storage unit, a remaining salt percentage is calculated by the following formula:

$$(S-H)\times 100\div S=F,$$

where S is the total height of the salt box, that is, the total height of the water softening agent storage unit, H is an actual height from the salt surface, that is, the information of distance between the top of the water softening agent and the photoelectric sensor, and F is the remaining salt percentage.

Furthermore, the remaining amount of the water softening agent before the resin regeneration is calculated through the following formula:

$$T\times Y=U,$$

where T is a total amount of salt that can be filled in the salt box, that is, the capacity of the water softening agent storage unit, with a unit of KG, Y is the remaining salt percentage, and U is a weight of the remaining salt, that is, the remaining amount of the water softening agent before the resin regeneration, with a unit of KG.

In this embodiment, by accurately obtaining the remaining amount of the water softening agent before the resin regeneration and the remaining amount of the water softening agent after the resin regeneration, the consumption of the water softening agent can be accurately determined to further determine the water consumption for the resin regeneration during the next resin regeneration process based on the consumption of the water softening agent, and the water consumption for the resin regeneration can be accurately controlled. Since the usage amount of the water softening agent is determined based on the water consumption for the resin regeneration, the usage amount of the water softening agent can be accurately controlled, which improves the water softening control efficiency of the water softener.

Based on the above embodiment, the above block 140 may include the following steps.

Step A: the second water consumption for the resin regeneration is determined by subtracting a first adjustment value from a first water consumption for the resin regeneration in accordance with a determination that the first consumption is greater than a consumption threshold of the water softening agent. The first adjustment value is an absolute value of a difference between the first consumption and the consumption threshold.

In block 140, the consumption threshold of the water softening agent is obtained and compared with the first consumption of the water softening agent, to obtain a result that the first consumption is greater than, equal to or less than the consumption threshold of the water softening agent.

Furthermore, in accordance with a determination that the first consumption is greater than the consumption threshold of the water softening agent, then an absolute value of a difference between the first consumption and the consumption threshold of the water softening agent is taken as the first adjustment value, the first adjustment value is subtracted from the first water consumption for the resin regeneration to obtain the second water consumption for the resin regeneration, that is, the water consumption for the resin regeneration during the next resin regeneration process.

It should be noted that in accordance with a determination that the first consumption is equal to the consumption threshold of the water softening agent, it no need to adjust the water consumption for the resin regeneration, and the first water consumption for the resin regeneration can be directly taken as the second water consumption for the resin regeneration.

Step B: the second water consumption for the resin regeneration is determined by adding a first adjustment value to a first water consumption for the resin regeneration in accordance with a determination that the first consumption is less than the consumption threshold of the water softening agent.

In accordance with a determination that the first consumption is less than the consumption threshold of the water softening agent, then the absolute value of the difference between the first consumption and the consumption threshold of the water softening agent is taken as the first adjustment value, the first water consumption for the resin regeneration is added by the first adjustment value, and the adjusted water consumption for the resin regeneration is taken as the second water consumption for the resin regeneration, that is, the water consumption for the resin regeneration during the next resin regeneration process.

In this embodiment, based on the comparison result of the consumption of the water softening agent and the consumption threshold, an adjusted first water consumption for the resin regeneration is taken as the water consumption for the resin regeneration during the next resin regeneration process, the usage amount of the water softening agent can be accurately controlled through accurately controlling the water consumption for the resin regeneration, and the water softening control efficiency of the water softener can be improved.

Figure 4:
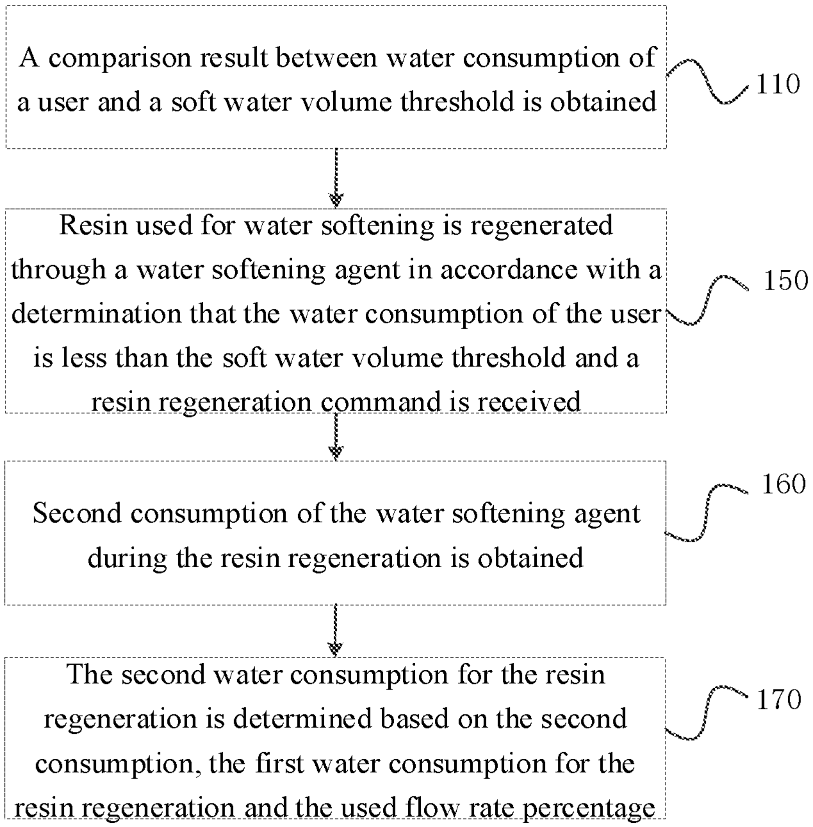
FIG. 4 is a fourth schematic flow chart of a water softening control method according to an embodiment of the present disclosure.

Based on the above embodiments, FIG. 4 is a fourth schematic flow chart of a water softening control method according to an embodiment of the present disclosure. As shown in FIG. 4, after the above step 110, the method may further include the following blocks.

Block 150: resin for water softening is regenerated through a water softening agent in accordance with a determination that the water consumption of the user is less than the soft water volume threshold and a resin regeneration command is received. The usage amount of the water softening agent is determined based on a used flow percentage and the first water consumption for the resin regeneration, and the used flow percentage is determined based on the water consumption of the user and the soft water volume threshold.

The water consumption of the user is less than the soft water volume threshold, which means that current resin still has a water softening capability, and theoretically it does not need to regenerate the resin in the resin tank. If the user needs human intervention to regenerate the resin and issue the resin regeneration command, after the resin regeneration command is received, the used flow rate percentage is calculated based on the water consumption of the user and the soft water volume threshold. The calculation formula for the used flow rate percentage is as follows:

$$K1 = 100 - (C1 - C2) \times 100 \div C1,$$

where C1 is the soft water volume threshold, C2 is the water consumption of the user, and K1 is the used flow percentage.

A product of the used flow percentage and the first water consumption for the resin regeneration is taken as the water consumption for the resin regeneration of this resin regeneration. A corresponding amount of water softening agent is dissolved based on the water consumption for the resin regeneration of this resin regeneration, the resin in the resin tank is regenerated by mixed liquid of dissolved water softening agent.

Block 160: second consumption of the water softening agent during the resin regeneration is obtained.

After the water softening agent is dissolved by using water volume of the product of the used flow percentage and the first water consumption for the resin regeneration, and the resin is regenerated, the remaining amount of the water softening agent before the resin regeneration needs to be obtained and taken as a third remaining amount, and the remaining amount of the water softening agent after the resin regeneration needs to be obtained and taken as a fourth remaining amount.

After the third remaining amount and the fourth remaining amount is obtained, a difference between the third remaining amount and the fourth remaining amount can be obtained. The difference is the consumption of the water softening agent during the resin regeneration, and it is defined as the second consumption.

Block 170: the second water consumption for the resin regeneration is determined based on the second consumption, the first water consumption for the resin regeneration and the used flow rate percentage.

In this embodiment, the second water consumption for the resin regeneration is the water consumption for the resin regeneration during the next resin regeneration process. The first water consumption for the resin regeneration is the water consumption for the resin regeneration during the previous resin regeneration process.

When the second water consumption for the resin regeneration based on the second consumption and the first water consumption for the resin regeneration is determined, it is also necessary to obtain the consumption threshold of the water softening agent. The consumption threshold of the water softening agent can be the amount of the water softening agent dissolved to achieve best effect of single resin regeneration with the water injection volume under default optimal experimental environment.

In this embodiment, whether to add, subtract or not adjust the first water consumption for the resin regeneration, as well as an adjustment amount when adjusting can be determined using the second consumption, the used flow rate percentage and the consumption threshold of the water softening agent.

In some embodiments, the above block 170 includes the following steps.

Step C: the second water consumption for the resin regeneration is determined by subtracting a second adjustment value from the first water consumption for the resin regeneration in accordance with a determination that the second consumption is greater than a first product. The second adjustment value is an absolute value of a difference between the second consumption and the first product, and the first product is a product of the used flow percentage and the consumption threshold of the water softening agent In this embodiment, the used flow rate percentage and the consumption threshold of the water softening agent are multiplied, and the product of the used flow rate percentage and the consumption threshold of the water softening agent value is determined as the first product.

In some embodiments, the second consumption is compared with the first product.

After comparison, in accordance with a determination that the second consumption is greater than the first product, an absolute value of a difference between the second consumption and the first product is calculated, and the absolute value of the difference between the second consumption and the first product is determined as the second adjustment value.

In some embodiments, the second adjustment value is subtracted from the first water consumption for the resin regeneration to obtain the second water consumption for the resin regeneration, that is, the water consumption for the resin regeneration during the next resin regeneration process.

It should be noted that in accordance with a determination that the second consumption is equal to the first product, it does not need to adjust the water consumption for the resin regeneration, and the first water consumption for the resin regeneration can be directly taken as the second water consumption for the resin regeneration.

Step D: the second water consumption for the resin regeneration is determined by adding a second adjustment value to the first water consumption for the resin regeneration in accordance with a determination that the second consumption is less than the first product.

In accordance with a determination that the second consumption is less than the first product, an absolute value of a difference between the second consumption and the first product is calculated, and the absolute value of the difference between the second consumption and the first product is determined as the second adjustment value.

In some embodiments, the first water consumption for the resin regeneration is added by the second adjustment value, and the adjusted water consumption for the resin regeneration is taken as the second water consumption for the resin regeneration, that is, the water consumption for the resin regeneration during the next resin regeneration process.

In this embodiment, when the user intervenes in resin regeneration, the used flow rate percentage is determined based on the water consumption of the user and the soft water volume threshold, the water consumption for the resin regeneration is adjusted based on the used flow rate percentage to accurately determine the water consumption for the resin regeneration of this resin regeneration, and the water consumption for the resin regeneration during the next resin regeneration process is determined based on the water softening agent consumption and the used flow rate of this resin regeneration, which can avoid excessive resin regeneration and accurately control the water consumption for the resin regeneration. Since the usage amount of the water softening agent is determined based on the water consumption for the resin regeneration, the usage amount of the water softening agent can be accurately controlled, and the water softening control efficiency of the water softener is improved.

Figure 5:
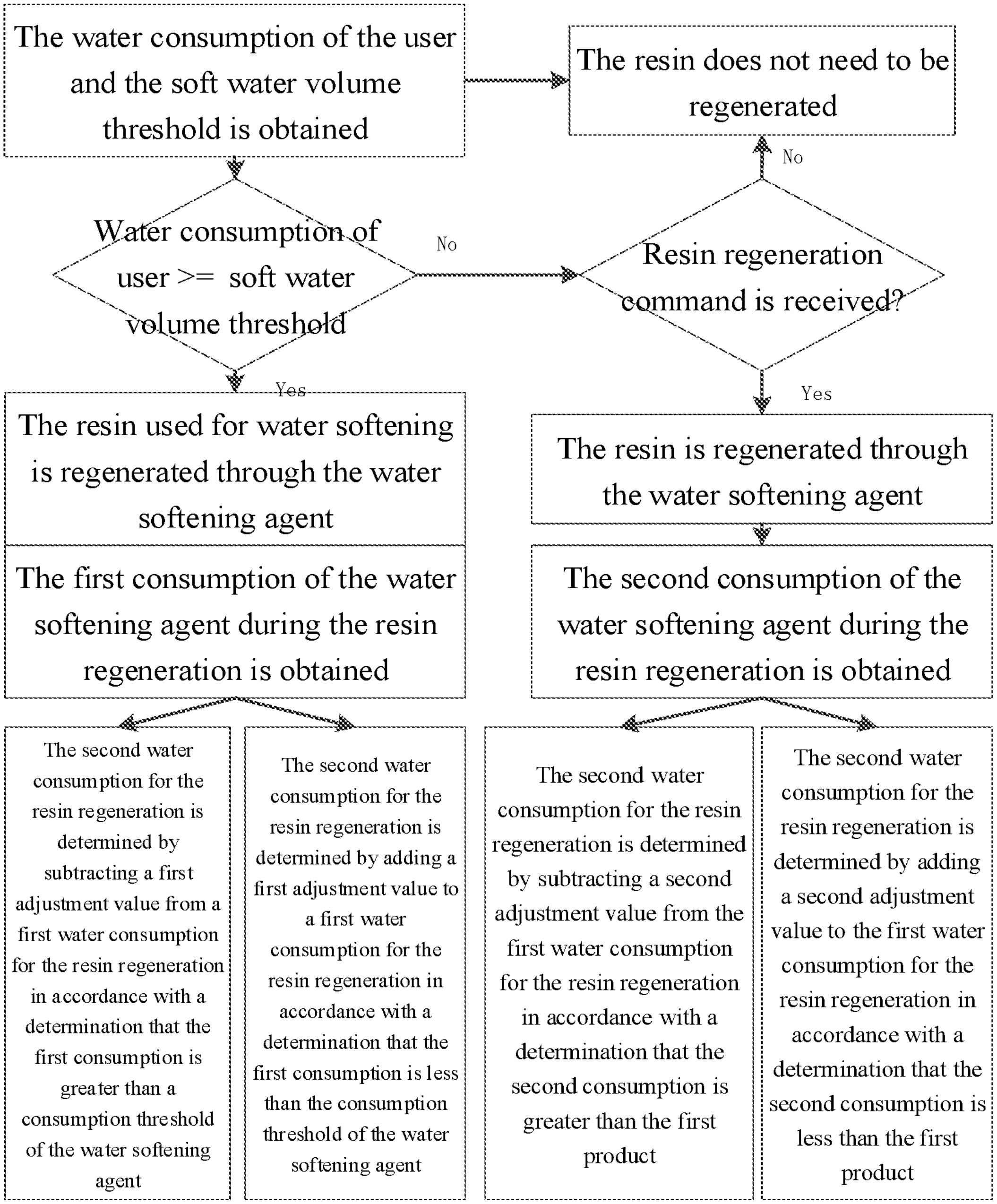
FIG. 5 is a fifth schematic flow chart of a water softening control method according to an embodiment of the present disclosure.

Based on the above embodiments, FIG. 5 is a fifth schematic flow chart of a water softening control method according to an embodiment of the present disclosure. As shown in FIG. 5, in this embodiment, the water consumption of the user and the soft water volume threshold are obtained, and the water consumption of the user is compared with the soft water volume threshold to determine whether to regenerate resin.

In accordance with a determination that the water consumption of the user is greater than or equal to the soft water volume threshold, the water softening agent is configured to regenerate the resin for water softening, the first consumption of the water softening agent during the resin regeneration is obtained, and the first consumption is compared with the consumption threshold of the water softening agent. In accordance with a determination that the first consumption is greater than the consumption threshold of the water softening agent, the second water consumption for the resin regeneration is determined by subtracting a first adjustment value from a first water consumption for the resin regeneration. In one embodiment, in accordance with a determination that the first consumption is less than a consumption threshold of the water softening agent, the second water consumption for the resin regeneration is determined by adding a first adjustment value to a first water consumption for the resin regeneration.

The first adjustment value is the absolute value of the difference between the first consumption and the consumption threshold.

In accordance with a determination that the water consumption of the user is less than the soft water volume threshold, the resin does not need to be regenerated unless the resin regeneration command is received. If the water consumption of the user is less than the soft water volume threshold and a resin regeneration instruction is received, the water softening agent is configured to regenerate the resin; the second consumption of the water softening agent during the resin regeneration is obtained, and the second consumption is compared with the soft water volume threshold. In accordance with a determination that the second consumption is greater than the first product, the second adjustment value is subtracted from the first water consumption for the resin regeneration to obtain the second water consumption for the resin regeneration. In accordance with a determination that the second consumption is less than the first product, the second water consumption for the resin regeneration is determined by adding the second adjustment value to the first water consumption for the resin regeneration.

The second adjustment value is the absolute value of the difference between the second consumption and the first product, and the first product is the product of the used flow rate and the consumption threshold of the water softening agent. The above-mentioned first water consumption for the resin regeneration is the water consumption for the resin regeneration during the previous resin regeneration process, and the second water consumption for the resin regeneration is the water consumption for the resin regeneration during the next resin regeneration process.

Figure 6:
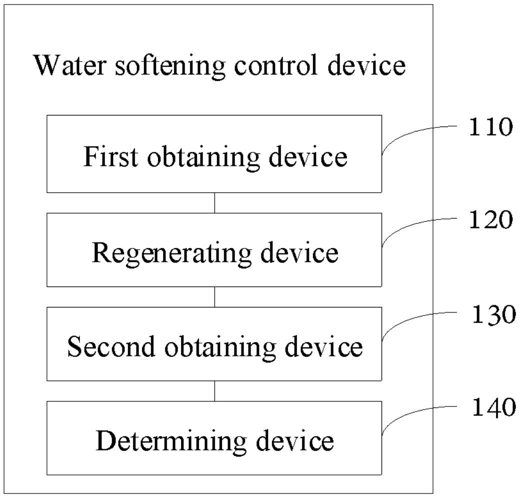
FIG. 6 is a schematic structural diagram of a water softening control apparatus according to an embodiment of the present disclosure.

FIG. 6 is a schematic structural diagram of a water softening control apparatus according to an embodiment of the present disclosure. As shown in FIG. 6, the water softening control device includes the following devices:

- a first obtaining device 110, configured to obtain a comparison result between water consumption of a user and a soft water volume threshold;
- a regenerating device 120, configured to regenerate resin for water softening through a water softening agent in accordance with a determination that the water consumption of the user is greater than or equal to the soft water volume threshold, where a usage amount of the water softening agent is determined based on first water consumption for the resin regeneration, and the first water consumption for the resin regeneration is water consumption for resin regeneration during a previous resin regeneration process;
- a second obtaining device 130, configured to obtain first consumption of the water softening agent during the resin regeneration; and
- a determining device 140, configured to determine second water consumption for the resin regeneration based on the first consumption and the first water consumption for the resin regeneration, where the second water consumption for the resin regeneration is water consumption for resin regeneration during a next resin regeneration process.

According to the water softening control device of the embodiment of the present disclosure, by regenerating the resin through the water softening agent in accordance with a determination that the water consumption of the user is greater than or equal to the soft water volume threshold, and accurately determining the water consumption for the resin regeneration during the next resin regeneration process based on consumption of water softening agent for resin regeneration and ideal water consumption for the resin regeneration, excessive resin regeneration is avoided, and the water consumption for the resin regeneration can be accurately controlled. Since the usage amount of the water softening agent is determined based on the water consumption for the resin regeneration, the usage amount of the water softening agent can be accurately controlled, and the water softening control efficiency of the water softener is improved.

Based on any of the above embodiments, the first obtaining device 110 includes a first obtaining unit, and the first obtaining unit is configured to:

- obtain a pulse signal generated when water flows through a flowmeter;
- determine a waterflow velocity based on the pulse signal; and
- determine the water consumption of the user based on the waterflow velocity and water usage duration.

Based on any of the above embodiments, the first obtaining unit further includes a first determining unit, and the first determining unit is configured to:

- determine a number of falling edges of the pulse signal; and
- determine the waterflow velocity based on the number of falling edges and a pulse conversion ratio of the flowmeter.

Based on any of the above embodiments, the second obtaining device 130 is configured to:

- obtain a first remaining amount of the water softening agent and a second remaining amount of the water softening agent, where the first remaining amount is a remaining amount of the water softening agent before the resin regeneration, and the second remaining amount is a remaining amount of the water softening agent after the resin regeneration; and determine the first consumption of the water softening agent during the resin regeneration based on the first remaining amount and the second remaining amount.

Based on any of the above embodiments, the second obtaining device 130 includes a second obtaining unit, and the second obtaining unit is configured to:

determine information of distance between a top of the water softening agent and a photoelectric sensor, where the photoelectric sensor is located on a top of a water softening agent storage unit; and determine the first remaining amount of the water softening agent based on the information of distance, a total height of the water softening agent storage unit and a capacity of the water softening agent storage unit.

Based on any of the above embodiments, the determining device 140 is configured to:

determine the second water consumption for the resin regeneration by subtracting a first adjustment value from a first water consumption for the resin regeneration in accordance with a determination that the first consumption is greater than a consumption threshold; and determine the second water consumption for the resin regeneration by adding a first adjustment value to a first water consumption for the resin regeneration in accordance with a determination that that the first consumption is less than the consumption threshold of the water softening agent;

where the first adjustment value is an absolute value of a difference between the first consumption and the consumption threshold.

Based on any of the above embodiments, the water softening control device further includes a processing device, and the processing device is configured to:

regenerate resin for water softening through a water softening agent in accordance with the determination that the water consumption of the user is less than the soft water volume threshold and a resin regeneration command is received, where the usage amount of the water softening agent is determined based on a used flow percentage and the first water consumption for the resin regeneration, and the used flow percentage is determined based on the water consumption of the user and the soft water volume threshold;

obtain second consumption of the water softening agent during the resin regeneration; and determine the second water consumption for the resin regeneration based on the second consumption, the first water consumption for the resin regeneration and the used flow rate percentage.

Based on any of the above embodiments, the processing device includes a second determining unit, and the second determining unit is configured to:

determine the second water consumption for the resin regeneration by subtracting a second adjustment value from the first water consumption for the resin regeneration in accordance with a determination that the second consumption is greater than a first product; or determine the second water consumption for the resin regeneration by adding a second adjustment value to the first water consumption for the resin regeneration in accordance with a determination that the second consumption is less than the first product;

where the second adjustment value is an absolute value of a difference between the second consumption and the first product, and the first product is a product of the used flow percentage and the consumption threshold of the water softening agent.

An embodiment of the present disclosure further provides a water softener, including a water softener body, a flowmeter, an electronic control system, a photoelectric sensor, a water softening agent storage unit and a processor provided in the water softener body, where when being executed, the processor performs methods provided by each of the above embodiments, for example, the method includes:

a comparison result between water consumption of a user and a soft water volume threshold is obtained;

resin for water softening is regenerated through a water softening agent in accordance with a determination that the water consumption of the user is greater than or equal to the soft water volume threshold, where a usage amount of the water softening agent is determined based on first water consumption for the resin regeneration, and the first water consumption for the resin regeneration is water consumption for resin regeneration during a previous resin regeneration process;

obtaining first consumption of the water softening agent during the resin regeneration; and determining second water consumption for the resin regeneration based on the first consumption and the first water consumption for the resin regeneration, where the second water consumption for the resin regeneration is water consumption for resin regeneration during a next resin regeneration process.

Figure 7:
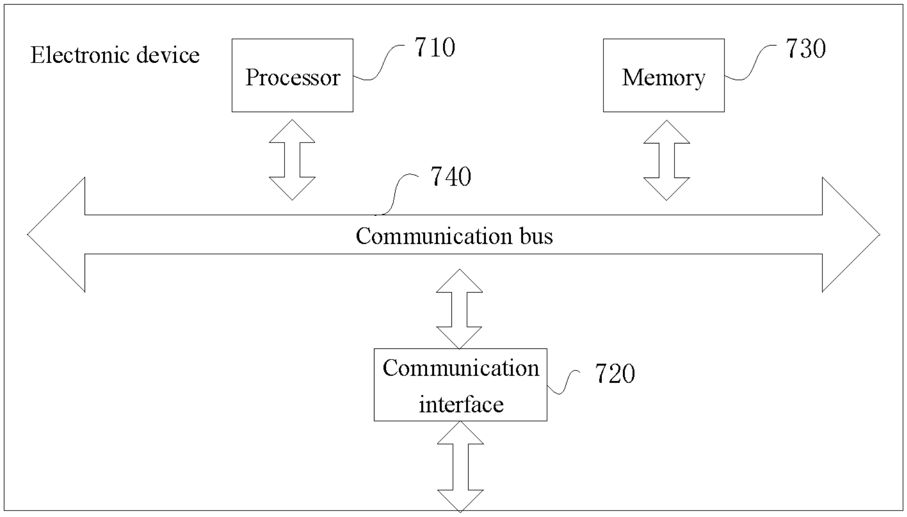
FIG. 7 is a schematic structural diagram of an electronic device according to an embodiment of the present disclosure.

FIG. 7 illustrates a schematic structural diagram of an electronic device according to an embodiment of the present disclosure. As shown in FIG. 7, the electronic device may include: a processor 710, a communications interface 720, a memory 730, and a communication bus 740. The processor 710, the communication interface 720, and the memory 730 communicate with each other through the communication bus 740. The processor 710 can invoke logical instructions in the memory 730 to perform the following method including:

a comparison result between water consumption of a user and a soft water volume threshold is obtained;

resin for water softening is regenerated through a water softening agent in accordance with a determination that the water consumption of the user is greater than or equal to the soft water volume threshold, where a usage amount of the water softening agent is determined based on first water consumption for the resin regeneration, and the first water consumption for the resin regeneration is water consumption for resin regeneration during a previous resin regeneration process;

first consumption of the water softening agent during the resin regeneration is obtained; and second water consumption for the resin regeneration is determined based on the first consumption and the first water consumption for the resin regeneration, where the second water consumption for the resin regeneration is water consumption for resin regeneration during a next resin regeneration process.

In addition, the above-mentioned logical instructions in the memory 730 can be implemented in the form of software functional units and can be stored in a computer-readable storage medium when sold or used as an independent product. Based on this understanding, the solution of the present disclosure is essentially or the part that contributes to the relevant technology or the part of the solution can be embodied in the form of a software product. The computer software product is stored in a storage medium and includes several instructions are configured to cause a computer device (which may be a personal computer, a server, or a network device, etc.) to execute all or part of the steps of the methods described in various embodiments of the present disclosure. The aforementioned storage medium includes: U disk, mobile hard disk, read-only memory (read-only memory, ROM), random access memory (random access memory, RAM), magnetic disk or optical disk and other media that can store program code.

An embodiment of the present disclosure further provides a computer program product including a computer program stored on a non-transitory computer-readable storage medium, the computer program including a program instruction. When the program instruction is executed by the computer, the computer can perform methods provided by each of the above embodiments, for example, a method includes:

a comparison result between water consumption of a user and a soft water volume threshold is obtained;

resin for water softening through a water softening agent is regenerated in accordance with a determination that the water consumption of the user is greater than or equal to the soft water volume threshold, where a usage amount of the water softening agent is determined based on first water consumption for the resin regeneration, and the first water consumption for the resin regeneration is water consumption for resin regeneration during a previous resin regeneration process;

first consumption of the water softening agent during the resin regeneration is obtained; and second water consumption for the resin regeneration is determined based on the first consumption and the first water consumption for the resin regeneration, where the second water consumption for the resin regeneration is water consumption for resin regeneration during a next resin regeneration process.

An embodiment of the present disclosure further provides a non-transitory computer-readable storage medium having a computer program stored thereon. When executed by a processor, the computer program performs methods provided by each of the above embodiments, for example, a method includes the following:

a comparison result between water consumption of a user and a soft water volume threshold is obtained;

resin for water softening through a water softening agent is regenerated in accordance with a determination that the water consumption of the user is greater than or equal to the soft water volume threshold, where a usage amount of the water softening agent is determined based on first water consumption for the resin regeneration, and the first water consumption for the resin regeneration is water consumption for resin regeneration during a previous resin regeneration process;

first consumption of the water softening agent during the resin regeneration is obtained; and second water consumption for the resin regeneration is determined based on the first consumption and the first water consumption for the resin regeneration, where the second water consumption for the resin regeneration is water consumption for resin regeneration during a next resin regeneration process.

The device embodiments described above are only schematic. The units described as separate components may or may not be physically separated. The components shown as units may or may not be physical units, that is, they may be located in one location, or it can be distributed across network units. Some or all of the modules can be selected based on actual needs to achieve the purpose of the solution of this embodiment.

Through the above description of the embodiments, it is understood that each embodiment can be implemented by software plus a necessary general hardware platform, and of course, it can also be implemented by hardware. Based on this understanding, the above embodiments can be embodied in the form of software products in essence or in part that contribute to related technologies. The computer software products can be stored in computer-readable storage medium, such as ROM/RAM, magnetic disks, optical disk, etc., including a number of instructions to cause a computer device (which can be a personal computer, a server, or a network device, etc.) to execute the methods described in various embodiments or various parts of the embodiments.

Finally, it should be noted that the above embodiments are only configured to illustrate the present disclosure, but not to limit the present disclosure. Although the present disclosure has been described in detail with reference to the embodiments.

What is claimed is:

1. A water softening control method, comprising:

obtaining a comparison result between water consumption of a user and a soft water volume threshold;

regenerating resin for water softening through a water softening agent in accordance with a determination that the water consumption of the user is greater than or equal to the soft water volume threshold, wherein a usage amount of the water softening agent is determined based on first water consumption for a resin regeneration, and the first water consumption for the resin regeneration is water consumption for resin regeneration during a previous resin regeneration process;

obtaining first consumption of the water softening agent during the resin regeneration, wherein obtaining the first consumption of the water softening agent comprises obtaining, by using a photoelectric sensor located on a top of a water softening agent storage unit, a first remaining amount of the water softening agent before the resin regeneration and a second remaining amount of the water softening agent after the resin regeneration, and determining the first consumption of the water softening agent based on a difference between the first remaining amount and the second remaining amount; and determining second water consumption for the resin regeneration based on the first consumption of the water softening agent and the first water consumption for the resin regeneration, wherein the second water consumption for the resin regeneration is water consumption for resin regeneration during a next resin regeneration process, and wherein the second water consumption is adjusted relative to the first water consumption based on an absolute value of a difference between the first consumption of the water softening agent and a consumption threshold of the water softening agent.

2. The method of claim 1, wherein determining the second water consumption for the resin regeneration based on the first consumption of the water softening agent and the first water consumption for the resin regeneration comprises:

determining the second water consumption for the resin regeneration by subtracting a first adjustment value from the first water consumption for the resin regeneration in accordance with a determination that the first consumption of the water softening agent is greater than the consumption threshold of the water softening agent; or determining the second water consumption for the resin regeneration by adding the first adjustment value to the first water consumption for the resin regeneration in accordance with a determination that the first consumption of the water softening agent is less than the consumption threshold of the water softening agent;

wherein the first adjustment value is the absolute value of the difference between the first consumption of the water softening agent and the consumption threshold.

3. The method of claim 1, wherein the water consumption of the user is obtained based on the following steps:

obtaining a pulse signal generated when water flows through a flowmeter;

determining a waterflow velocity based on the pulse signal; and determining the water consumption of the user based on the waterflow velocity and water usage duration.

4. The method of claim 3, wherein determining the waterflow velocity based on the pulse signal comprises:

determining a number of falling edges of the pulse signal; and determining the waterflow velocity based on the number of falling edges and a pulse conversion ratio of the flowmeter.

5. The method of claim 1, wherein obtaining the first remaining amount of the water softening agent comprises:

determining information of distance between a top of the water softening agent and a photoelectric sensor, wherein the photoelectric sensor is located on a top of a water softening agent storage unit; and determining the first remaining amount of the water softening agent based on the information of distance, a total height of the water softening agent storage unit and a capacity of the water softening agent storage unit.

6. The method of claim 1, wherein after obtaining the comparison result between the water consumption of the user and the soft water volume threshold, the method further comprises:

regenerating the resin for water softening through the water softening agent in accordance with a determination that the water consumption of the user is less than the soft water volume threshold and a resin regeneration command is received, wherein the usage amount of the water softening agent is determined based on a used flow percentage and the first water consumption for the resin regeneration, and the used flow percentage is determined based on the water consumption of the user and the soft water volume threshold;

obtaining second consumption of the water softening agent during the resin regeneration; and determining the second water consumption for the resin regeneration based on the second consumption, the first water consumption for the resin regeneration and the used flow rate percentage.

7. The method of claim 6, wherein determining the second water consumption for the resin regeneration based on the second consumption, the first water consumption for the resin regeneration and the used flow rate percentage comprises:

determining the second water consumption for the resin regeneration by subtracting a second adjustment value from the first water consumption for the resin regeneration in accordance with a determination that the second consumption is greater than a first product; or determining the second water consumption for the resin regeneration by adding a second adjustment value to the first water consumption for the resin regeneration in accordance with a determination that the second consumption is less than the first product;

wherein the second adjustment value is an absolute value of a difference between the second consumption and the first product, and the first product is a product of the used flow percentage and the consumption threshold of the water softening agent.

8. A water softening control device, comprising:

a first obtaining device, configured to obtain a comparison result between water consumption of a user and a soft water volume threshold;

a regenerating device, configured to regenerate resin for water softening through a water softening agent in accordance with a determination that the water consumption of the user is greater than or equal to the soft water volume threshold, wherein a usage amount of the water softening agent is determined based on first water consumption for the resin regeneration, and the first water consumption for the resin regeneration is water consumption for resin regeneration during a previous resin regeneration process;

a second obtaining device, configured to obtain first consumption of the water softening agent during the resin regeneration, wherein the second obtaining device is configured to obtain, by using a photoelectric sensor located on a top of a water softening agent storage unit, a first remaining amount of the water softening agent before the resin regeneration and a second remaining amount of the water softening agent after the resin regeneration, and determine the first consumption of the water softening agent based on a difference between the first remaining amount and the second remaining amount; and a determining device, configured to determine second water consumption for the resin regeneration based on the first consumption of the water softening agent and the first water consumption for the resin regeneration, wherein the second water consumption for the resin regeneration is water consumption for resin regeneration during a next resin regeneration process, and wherein the determining device is configured to adjust the second water consumption relative to the first water consumption based on an absolute value of a difference between the first consumption of the water softening agent and a consumption threshold of the water softening agent.

9. A water softener, comprising a water softener body, a flowmeter, an electronic control system, a photoelectric sensor, a water softening agent storage unit, and a processor disposed in the water softener body, wherein the processor implements the water softening control method of claim 1.

10. An electronic device, comprising a memory, a processor and a computer program stored in the memory and executable on the processor, wherein the computer program, when executed by the processor, causes the processor to implement the water softening control method of claim 1.

11. A non-transitory computer-readable storage medium having a computer program stored thereon, wherein when executed by a processor, causes the processor to implement the water softening control method of claim 1.

12. A computer program product, comprising a computer program, wherein the computer program, when executed by a processor, causes the processor to implement a water softening control method, comprising:

obtaining a comparison result between water consumption of a user and a soft water volume threshold;

regenerating resin for water softening through a water softening agent in accordance with a determination that the water consumption of the user is greater than or equal to the soft water volume threshold, wherein a usage amount of the water softening agent is determined based on first water consumption of a resin regeneration, and the first water consumption for the resin regeneration is water consumption for resin regeneration during a previous resin regeneration process;

obtaining first consumption of the water softening agent during the resin regeneration, wherein obtaining the first consumption of the water softening agent comprises obtaining, by using a photoelectric sensor located on a top of a water softening agent storage unit, a first remaining amount of the water softening agent before the resin regeneration and a second remaining amount of the water softening agent after the resin regeneration, and determining the first consumption of the water softening agent based on a difference between the first remaining amount and the second remaining amount; and determining second water consumption for the resin regeneration based on the first consumption of the water softening agent and the first water consumption for the resin regeneration, wherein the second water consumption for the resin regeneration is water consumption for resin regeneration during a next resin regeneration process, and wherein the second water consumption is adjusted relative to the first water consumption based on an absolute value of a difference between the first consumption of the water softening agent and a consumption threshold of the water softening agent.

13. The computer program product of claim 12, wherein determining the second water consumption for the resin regeneration based on the first consumption of the water softening agent and the first water consumption for the resin regeneration comprises:

determining the second water consumption for the resin regeneration by subtracting a first adjustment value from the first water consumption for the resin regeneration in accordance with a determination that the first consumption of the water softening agent is greater than the consumption threshold of the water softening agent; or determining the second water consumption for the resin regeneration by adding the first adjustment value to the first water consumption for the resin regeneration in accordance with a determination that the first consumption of the water softening agent is less than the consumption threshold of the water softening agent;

wherein the first adjustment value is the absolute value of the difference between the first consumption of the water softening agent and the consumption threshold.

14. The computer program product of claim 12, wherein the water consumption of the user is obtained based on the following steps:

obtaining a pulse signal generated when water flows through a flowmeter;

determining a waterflow velocity based on the pulse signal; and determining the water consumption of the user based on the waterflow velocity and water usage duration.

15. The computer program product of claim 14, wherein determining the waterflow velocity based on the pulse signal comprises:

determining a number of falling edges of the pulse signal; and determining the waterflow velocity based on the number of falling edges and a pulse conversion ratio of the flowmeter.

16. The computer program product of claim 12, wherein obtaining the first remaining amount of the water softening agent comprises:

determining information of distance between a top of the water softening agent and a photoelectric sensor, wherein the photoelectric sensor is located on a top of a water softening agent storage unit; and determining the first remaining amount of the water softening agent based on the information of distance, a total height of the water softening agent storage unit and a capacity of the water softening agent storage unit.

17. The computer program product of claim 12, wherein after obtaining the comparison result between the water consumption of the user and the soft water volume threshold, the method further comprises:

regenerating the resin for water softening through the water softening agent in accordance with a determination that the water consumption of the user is less than the soft water volume threshold and a resin regeneration command is received, wherein the usage amount of the water softening agent is determined based on a used flow percentage and the first water consumption for the resin regeneration, and the used flow percentage is determined based on the water consumption of the user and the soft water volume threshold;

obtaining second consumption of the water softening agent during the resin regeneration; and determining the second water consumption for the resin regeneration based on the second consumption, the first water consumption for the resin regeneration and the used flow rate percentage.

18. The computer program product of claim 17, wherein determining the second water consumption for the resin regeneration based on the second consumption, the first water consumption for the resin regeneration and the used flow rate percentage comprises:

determining the second water consumption for the resin regeneration by subtracting a second adjustment value from the first water consumption for the resin regeneration in accordance with a determination that the second consumption is greater than a first product; or determining the second water consumption for the resin regeneration by adding a second adjustment value to the first water consumption for the resin regeneration in accordance with a determination that the second consumption is less than the first product;

wherein the second adjustment value is an absolute value of a difference between the second consumption and the first product, and the first product is a product of the used flow percentage and the consumption threshold of the water softening agent.

* * * * *